Oct. 14, 1958  F. COREY ET AL  2,855,625
POULTRY PROCESSING EQUIPMENT
Filed Dec. 2, 1955  3 Sheets-Sheet 1

INVENTORS.
FREDERICK C. COREY
FLOURNOY COREY
BY Flournoy Corey
ATTORNEY.

INVENTORS.
FREDERICK C. COREY
FLOURNOY COREY
BY Flournoy Corey
ATTORNEY.

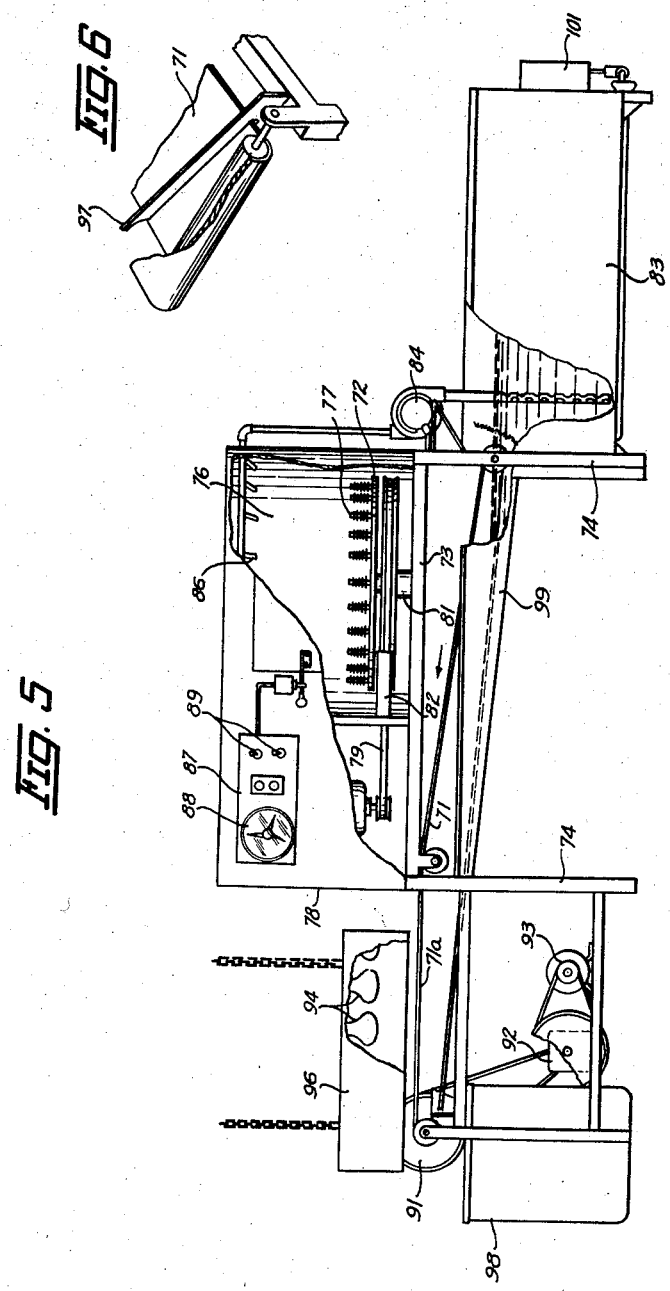

![](United States Patent Office)

2,855,625
POULTRY PROCESSING EQUIPMENT

Flournoy Corey and Frederick C. Corey,
Cedar Rapids, Iowa

Application December 2, 1955, Serial No. 550,539

5 Claims. (Cl. 17—11.1)

This invention relates to equipment for the dressing of poultry and has particular relation to means for scalding and defeathering the poultry by use of the defeathering equipment.

In dressing poultry in the conventional manner, the process of dressing is usually accomplished in three different steps of killing and draining the birds, scalding them, and defeathering them, with suitable equipment for each of the steps, and this conventional dressing process requires moving the poultry from one piece of equipment to another, either by manual means or by conveyors and the like.

One of the main objects of our invention is to provide means for accomplishing the several steps of the dressing operation in one, or two steps at the most, and employing the defeathering apparatus for both the scalding and defeathering operations or, as an alternative, to accomplish all three steps in the one piece of apparatus; that is, the killing, scalding and defeathering operations may be accomplished in one piece of apparatus by practicing our invention.

Still another object of our invention is to provide means for removing the feathers and other debris from the vicinity of the defeathering apparatus.

Still another object of our invention is to provide means for drying and reclaiming the feathers so removed. We have discovered that it is very desirable in the scalding operation to provide means for turning and agitating the birds so that the scalding fluid be uniformly applied to the feathers of the birds and thoroughly wet the feathers as well as the skin of the birds so as to insure complete scalding of the bird. This is especially desirable for dressing ducks, for instance.

It is therefore another object of our invention to provide means for agitating the birds during the scalding operation.

Still another object of our invention is to provide apparatus which may be easily maintained in a high degree of cleanliness.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

In said drawings:

Figure 5 is a view in side elevation of another embodiment of our invention, with portions of the walls torn away to illustrate the mechanism, and Figure 6 is a view in perspective and fragmentary relation of the means utilized for removing the feathers from the belt of the conveyor shown in Figure 5.

Figure 1:
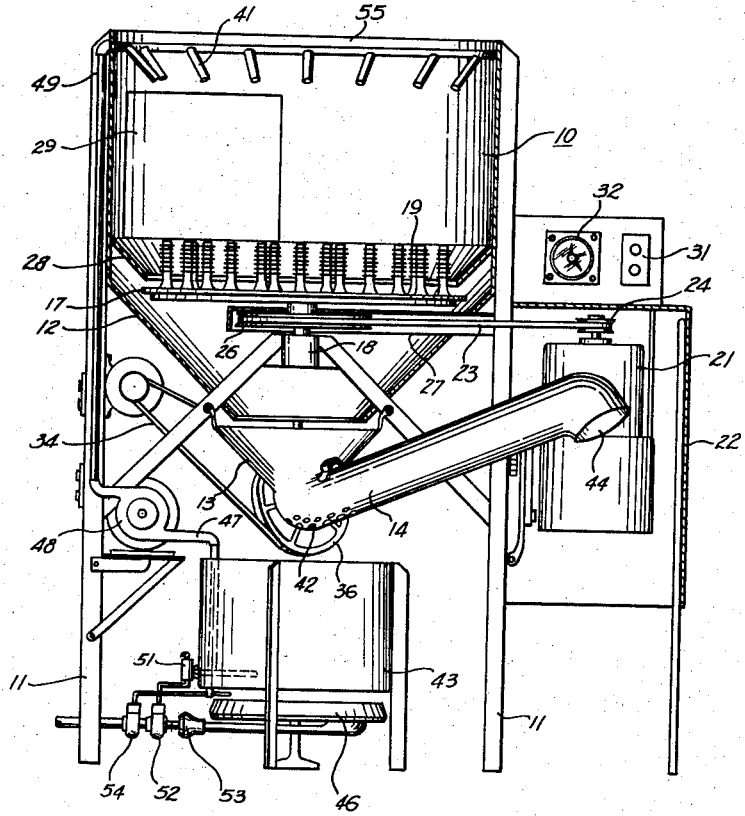
Figure 1 is a view, partly in section and partly in elevation, of a machine constructed according to one embodiment of our invention.
Figure 2:
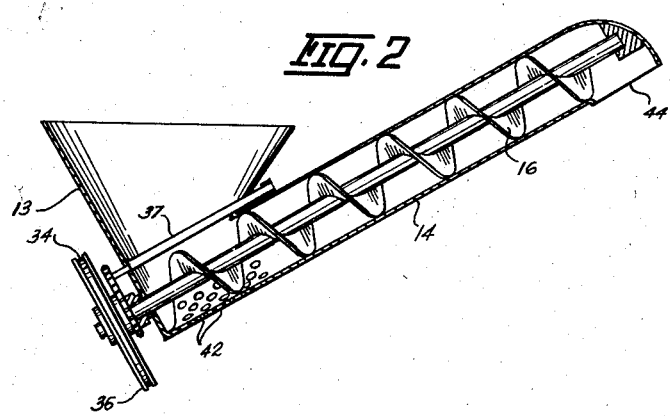
Figure 2 is a view, partly in elevation and partly in section, of the screw conveyor, the outside casing of which is shown in Figure 1.
Figure 3:
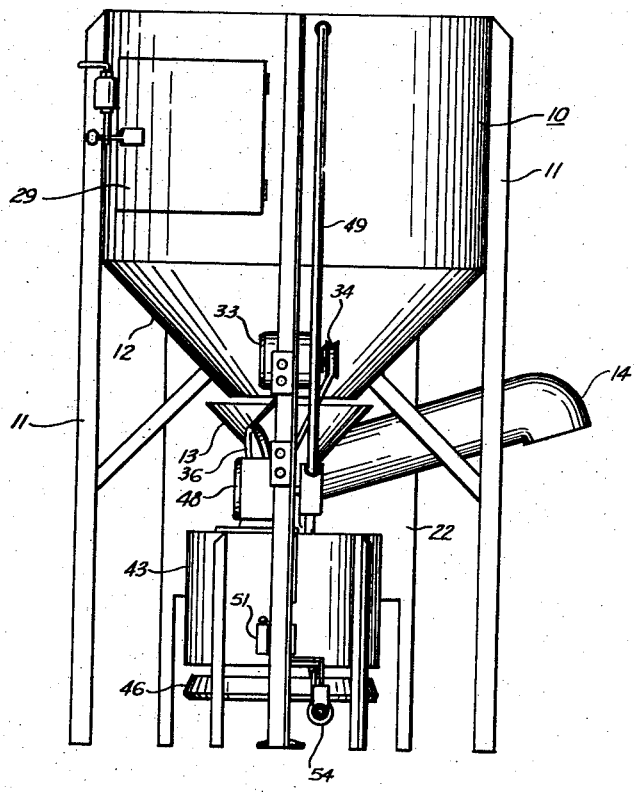
Figure 3 is a view in end elevation of the machine shown in Figure 1.
Figure 4:
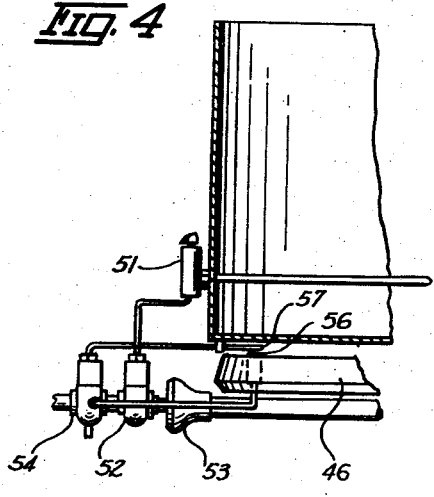
Figure 4 is a view, partly in elevation and partly in section, of a control apparatus for the scalding tank of the device shown in Figures 1 and 3.

Referring now to the drawings, and more particularly to Figure 1, we have shown a substantially cylindrical housing 10, supported well above the floor by means of a supporting framework including legs 11. This housing 10 is enclosed at its lower end by an inverted, twopart, conical hopper with a frusto-conical portion as at 12, which is attached to the lower portion of the housing 10 and an inverted, substantially conical hopper 13 for feeding feathers into the tube of the pipe-like housing 14 of the screw conveyor illustrated at 16 in Figure 2.

The disk 17 of a disk picker, mounted on a vertical axis 18 for rotation in a horizontal plane, is provided with rubbing members illustrated at 19. The disk is driven by means of a motor 21, mounted in the sub-frame 22 through the agency of the belt 23, the motor pulley 24, and the driven pulley 26. The motor may be of conventional, single-speed type, or a two-speed type to afford two speeds of the disk. A gear reducer may be employed between motor and disk. A housing 27 is provided for the disk drive and an inverted frusto-conical guard chute, or skirt 28, is provided on the inside of the cylindrical housing 10, preferably at a position so that the inner lower edge thereof extends over the outer edge of the disk 17.

The birds may be dropped into the housing 10 through the opening at the top of the housing and the birds may be ejected or withdrawn through a door 29.

Control apparatus for controlling the motor is mounted at 31, and a timer for the motor at 32. If the motor employed is of the two-speed type, the timer selected will be of the sequence type whereby the motor may be operated at a low speed for a period, and then at a higher speed for a second period.

A small motor is located on the lower wall of the housing 33 and this motor, through drive driven pulleys and belt 34, drives the large pulley 36 which, in turn, drives the screw conveyor 16 through the agency of reduction gearing 37. The members 41 are water nozzles or scalding fluid nozzles and the water, after it passes down upon the birds on the disk, is directed by the disk and hoppers toward the center of the machine. The water passes out through openings 42 in the lower portion of the hopper 13, and is received within the tank 43 below the machine.

The feathers, of course, are carried down by the water, and by gravity, into the hopper 13 and the lower portion thereof and the screw conveyor carries them out from beneath the machine and discharges them through the discharge opening 44 of the screw conveyor.

Water within the tank 43 is heated by means of the gas burner or other heating means, and this heated water is pumped out of the tank at the bottom thereof by means of the pipe 47 through the agency of the pump 48, and is carried up through the conduit 49 and back out through the nozzles 41.

The temperature of the water in the tank 43 is controlled by means of the thermostat 51, which actuates a gas valve 52 to start and stop the flow of gas to the burner. The member 53 is the air mixer for the gas burner, and the member 54 is the pilotstat commonly used as a safety feature for the gas burner. The member 56 is the pilot burner, and the member 57 is the thermocouple for the pilotstat. All this is in accordance with the usual practice for gas burners and of course other heating elements, such as steam, or electric, or oil burners and so on, may be used.

In operation the birds are placed in the machine through the top opening 55, either right after the sticking operation, or after the sticking and draining operation has been completed. The pump 48 is turned on and hot water is forced over the birds by the nozzles 41 as the birds lie on top of the rubbing members 19. The disk 17 may be rotated either intermittently or at reduced or full speeds, to move the birds and agitate them sufficiently so that the water reaches all parts of the bird. After the scalding operation is complete, it is then necessary to defeather the birds and operation of the disk picker at its usual speed will remove the feathers.

The feathers are carried by the water from the nozzles 41 down to the upper face of the disk 17, and are flung outwardly by the disk to the side wall of the housing 10 and the frusto-conical hopper 12, and down into the hopper 13. The water passes down through the openings 42 into the tank 43, and the feathers are carried by the screw conveyor through the conveyor chute 14, and out through the discharge opening 44. A can, or suitable receptacle, may be put under the spout 44 of the screw conveyor 14 to catch the feathers, and of course screens and the like may be placed in the upper portion of the tank 43 to screen out any debris that might pass through the openings 42.

If desired, the birds may be stuck, or their throats cut, and they could be deposited immediately on top of the disk, with the disk stationary, and their own movements are sufficient to cause them to drain. If this is done, however, it is desirable to catch the blood by inserting a trough or chute underneath the hopper 12. From this point forward the operation of scalding and dressing the bird is accomplished as before.

Another embodiment of our invention is shown in Figures 5 and 6. In this embodiment, substantially the same system is employed as before, but a belt conveyor 71 is used to carry away the feathers from beneath the machine instead of the screw conveyor of Figures 1, 2, 3 and 4.

In this device the disk 72 is mounted for rotation within a framework including horizontal members 73 and legs 74, and the disk is enclosed by means of a cylindrical housing 76 in the same manner as that of Figure 1. The disk 72 is provided with rubbing members 77 and is driven by means of the motor 78 through the agency of the drive belt and pulleys illustrated in 79.

A reduction gear may be employed at 81 if desired, and the belts are guarded by means of guards 82. The motor may be single or two-speed, straight or reduction gear drive.

The scalding tank is located at 83 to one side of the machine, and a pump 84 supplies water for the nozzles 86 in order to supply water to the birds for scalding them. The panel 87 is the control panel and has a timer 88 and control switches 89 for controlling the motor. The timer may be a sequence type to cause the motor to operate intermittently, or at a lower speed and then at full speed.

The conveyor 71 is driven through the drive pulley 91, driven in turn by the speed reducer 92 and the motor 93. The feathers, of course, are carried along the top of the belt as illustrated by the arrow and pass along the horizontal flight 71a and, if desired, heating elements such as the heat lamps 94, located in the housing 96, may be employed to dry the feathers.

The feathers may be removed from the upper face of the belt by means of an angled scraper blade 97 and are deposited in a suitable receptacle such as the large can 98. The scraper may be so positioned above the belt that the feathers are scraped sideways from the belt and the other smaller, heavier debris will pass over the end of the belt.

The water from the scalding operation and from the picking operation drops into the trough 99 and runs back into the scalding tank 83.

The members indicated at 101 are the controls such as previously described.

The operation of this machine is substantially the same as that shown in Figures 1 to 4 inclusive and the birds are deposited in the housing after the bleeding has been completed, and the pump 84 energized to deliver water through the nozzles 86 to the birds to accomplish the scalding operation. The disk may remain motionless or may be intermittently operated or continuously operated to agitate the birds to the degree desired and, after the scalding operation is completed, the picking operation is begun and completed by operating the picking disk at its full speed. It is preferably that the amount of water delivered to the birds during the picking operation be reduced, but this is not important nor necessary and the water may be delivered at full flow is desired. It is only necessary that sufficient water be delivered during the picking operation to flush away the feathers.

Although we have described several embodiments of our invention, it is apparent that modifications may be made by those skilled in the art. Such modifications may be made without departing from the spirit and scope of our invention as set forth in the appended claims.

We claim as our invention:

1. A fowl dressing apparatus comprising a stationary vertically disposed casing having the upper end thereof open to receive feathered fowl, a horizontally disposed rotatable circular platform adjacent the lower end of said casing, circular platform supporting means connected to said circular platform for supporting the same for rotating movement, a multiple speed circular platform rotating means operatively connected to said circular platform for selectively rotating the same at different speeds, a plurality of fowl resilient agitating members extending from a major portion of said circular platform adjacent the periphery thereof toward the interior of said casing, means supported within said casing above said circular platform for directing a scalding fluid downwardly upon the peripheral edge of said circular platform, a housing supported below said casing for collecting spent scalding fluid and feathers removed from said fowl, said housing having an outlet for spent scalding fluid and a conveyor means supported in said housing and extending therethrough to a discharge point remote with respect to said casing.

2. A fowl dressing apparatus as set forth in claim 1 wherein said housing comprises an inverted, frusto-conical member having an upwardly extending conduit connected to said frusto-conical member by an elbow, said below being provided with fluid discharge openings to permit the flow of spent scalding liquid from said housing and said conveyor means comprising a screw conveyor mounted for rotation in said upwardly extending conduit and extending from a point in said elbow above said discharge openings therein.

3. A fowl dressing apparatus as set forth in claim 1 wherein said housing comprises an open inclined trough having an opening in the lowermost end thereof and said conveyor means comprises a belt conveyor transversely and upwardly between said casing and said open trough to a point remote with respect to said casing.

4. A fowl dressing apparatus in which fowl are simultaneously tumbled and the feathers thereon positively agitated while said fowl moves in a circular horizontally-extending path through streams of scalding fluid flowing transversely of said horizontal path of movement of said fowl which apparatus comprises, a stationary vertically disposed casing having an upper end open to receive feathered fowl and a lower end open to permit the passage of feathers and spent scalding fluid therethrough, a horizontally disposed rotatable circular platform in said casing adjacent the lower end thereof, circular platform supporting means connected to said platform for supporting the same for rotating movement, a circular platform rotating means operatively connected to said circular platform, a plurality of resilient elongated fowl tumbling and feather agitating members extending from a major portion of said circular platform adjacent the peripheral edge thereof and toward the interior of said casing for moving fowl in a circular horizontally-extending path adjacent said casing while, simultaneously, tumbling the fowl and agitating the feathers thereon, and a conduit for a scalding fluid supported in said casing above said circular platform, said conduit having a plurality of scalding fluid outlets directed downwardly upon the surface of said circular platform adjacent the peripheral edge thereof for delivering a plurality of streams of scaling fluid, each in a linear path extending transversely to the circular horizontally extending path of movement of said fowl, a housing supported below the lower open end of said casing for collecting spent scalding fluid and feathers removed from said fowl, said housing having an outlet for spent scalding fluid and a conveyor means supported in said housing and extending transversely therethrough to a discharge point remote with respect to said casing for separating feathers from said spent scalding fluid and discharging feathers from said apparatus.

5. A fowl dressing apparatus as set forth in claim 4 wherein said conveyor comprises a feather engaging element extending transversely of said housing and a conveyor moving means operatively connected to said feather engaging element for moving said element through the housing to said housing discharge point.

References Cited in the file of this patent

UNITED STATES PATENTS

| | | |
|---|---|---|
| 1,329,724 | Nayer | Feb. 3, 1920 |
| 1,909,245 | Anstice | May 16, 1933 |
| 2,657,801 | Quilling | Nov. 3, 1953 |
| 2,694,829 | Johnson | Nov. 23, 1954 |
| 2,754,539 | Toti | July 17, 1956 |
| 2,777,158 | Pitts et al. | Jan. 15, 1957 |
| 2,777,159 | Pitts et al. | Jan. 15, 1957 |